No. 866,166. PATENTED SEPT. 17, 1907.
G. W. THEISS, R. J. W. WHANN & W. J. ENGLISBEE.
LOADING AND UNLOADING APPARATUS.
APPLICATION FILED MAY 21, 1907.
4 SHEETS—SHEET 1.
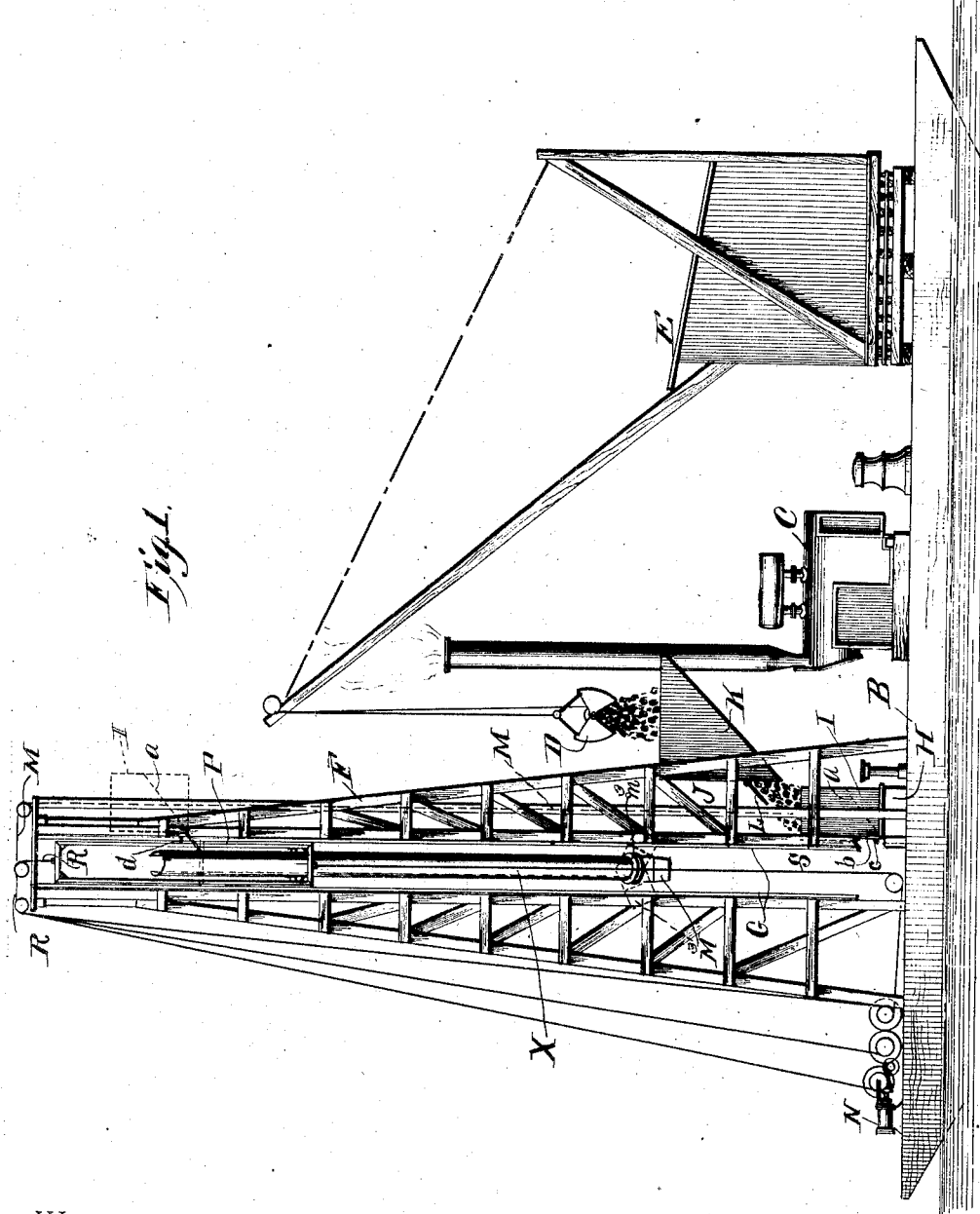

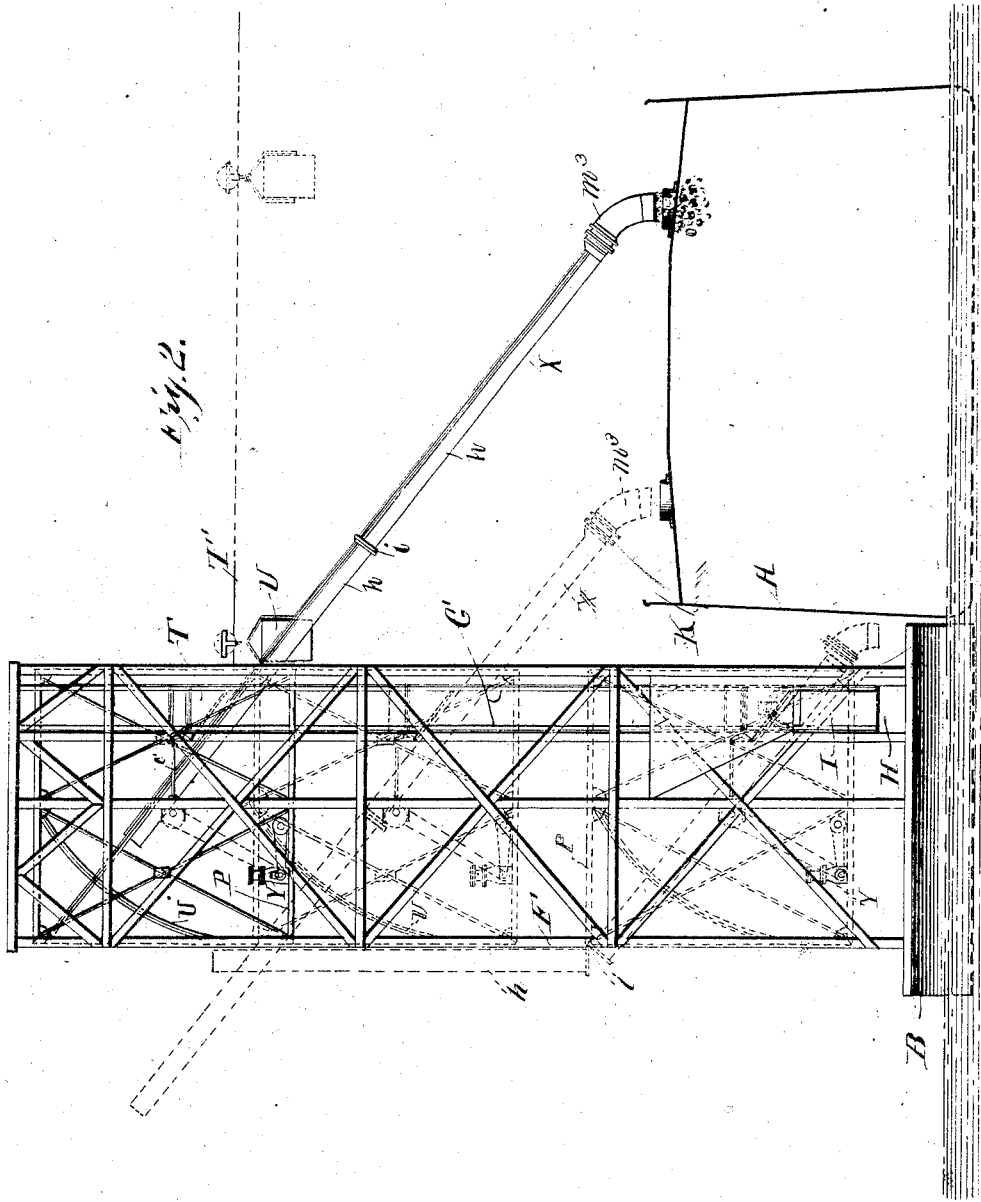

No. 866,166. PATENTED SEPT. 17, 1907.
G. W. THEISS, R. J. W. WHANN & W. J. ENGLISBEE.
LOADING AND UNLOADING APPARATUS.
APPLICATION FILED MAY 21, 1907.
4 SHEETS—SHEET 3.
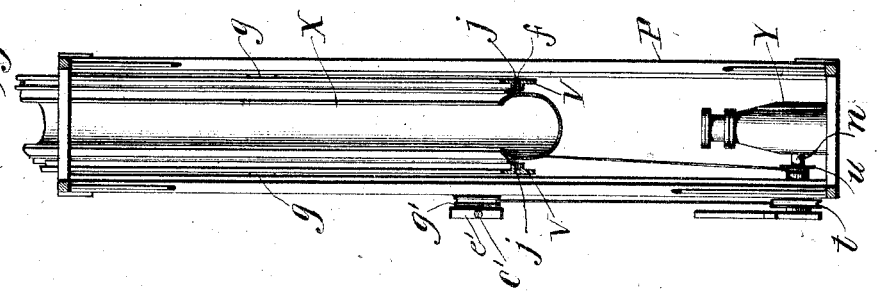
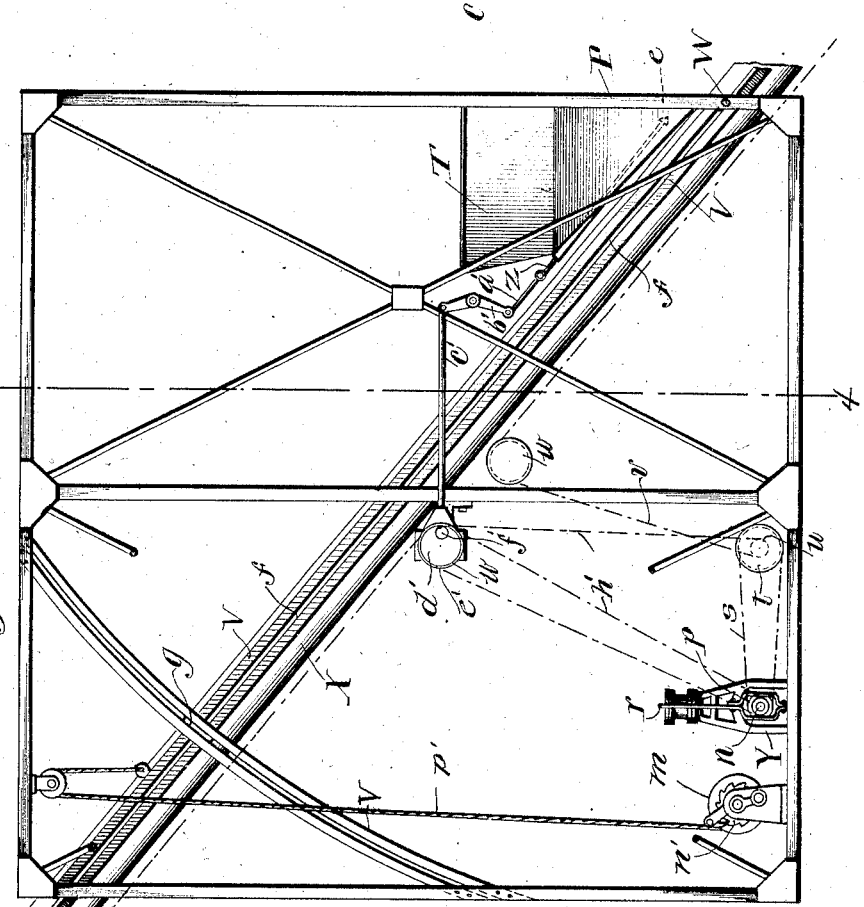

No. 866,166. PATENTED SEPT. 17, 1907.
G. W. THEISS, R. J. W. WHANN & W. J. ENGLISBEE.
LOADING AND UNLOADING APPARATUS.
APPLICATION FILED MAY 21, 1907.
4 SHEETS—SHEET 4.
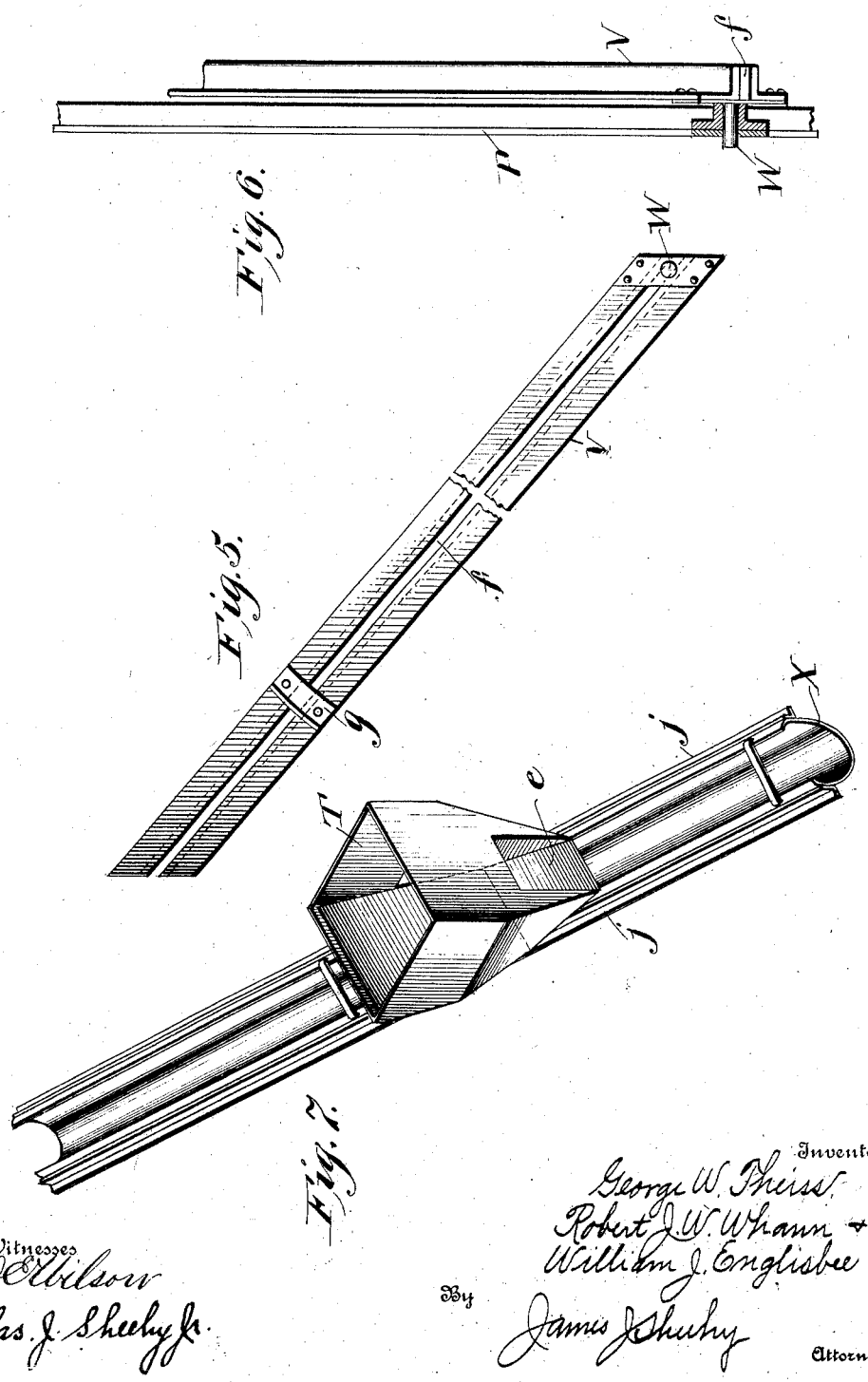

UNITED STATES PATENT OFFICE.

GEORGE W. THEISS, OF PITTSBURG, PENNSYLVANIA, AND ROBERT J. W. WHANN AND WILLIAM J. ENGLISBEE, OF NEW ORLEANS, LOUISIANA.

LOADING AND UNLOADING APPARATUS.

No. 866,166.

Specification of Letters Patent.

Patented Sept. 17, 1907.

Application filed May 21, 1907. Serial No. 374,890.

*To all whom it may concern:*

Be it known that we, GEORGE W. THEISS, ROBERT J. W. WHANN, and WILLIAM J. ENGLISBEE, citizens of the United States, the former residing at Pittsburg, in the county of Allegheny and State of Pennsylvania, and the two latter at New Orleans, parish of Orleans, State of Louisiana, have invented new and useful Improvements in Loading and Unloading Apparatus, of which the following is a specification.

Our invention pertains to loading and unloading apparatus and more particularly to loading and unloading apparatus for handling coal; and it has for one of its objects to provide a simple and efficient apparatus through the medium of which coal or other material may be expeditiously taken from a source of supply and elevated to various heights and there discharged into conveying means for taking it to the point desired.

Another object of the invention is the provision in a loading and unloading apparatus of a chute arranged to be positioned at various heights to receive coal or other material from the elevating means and also arranged to be swung vertically and adjusted in the direction of its length so as to position its discharge end at various distances from the vertical plane of the elevating means as circumstances require.

Another object is the provision in combination with the chute of a loading and unloading apparatus of a discharge nozzle connected with the discharge end of the chute in such manner that it is capable of being disposed in various directions to deflect the material being handled to different points about the discharge end of the chute.

Other advantageous features of our invention will be fully understood from the following description and claims when the same are read in connection with the accompanying drawings, forming part of this specification, in which:

Figure 1 is an elevation of the apparatus constituting the present and preferred embodiment of our invention.
Fig. 2 is a view taken at a right angle to Fig. 1 and illustrating our apparatus in end elevation as properly arranged relative to a barge upon which coal is to be loaded, and also illustrating the vertically adjustable frame and the chute of the apparatus in various positions by full and dotted lines. Fig. 3 is a side elevation illustrating the vertically adjustable frame of the apparatus and the parts carried by said vertically adjustable frame as removed from the main frame. Fig. 4 is a transverse section taken in the plane indicated by the line 4—4 of Fig. 3, looking in the direction of the arrow. Fig. 5 is an enlarged detail view illustrating one of the vertically swinging supports and guides of the chute. Fig. 6 is an enlarged detail section showing the manner in which the said chute support and guide is pivotally connected with the vertically adjustable frame. Fig. 7 is a detail perspective view illustrating the arrangement of the hopper carried by the vertically adjustable frame and adapted to receive from the elevating receptacle, relative to the chute into which it is arranged to discharge material.

Referring by letter to the said drawings: A is a vessel upon which coal is to be loaded, and B is a barge upon which our novel apparatus is preferably, though not necessarily, arranged and carried; the said barge being designed to be arranged as shown in Fig. 2, relative to the vessel A, when coal is to be delivered to the latter.

C is a steam boiler arranged on the barge B and designed to supply steam for actuating the engines of the apparatus.

D is a clam-shell bucket for taking coal from a car or other source of supply and transferring the same to the storage bin, presently described, of our novel apparatus, and E is the means for raising and lowering the clam-shell bucket and swinging the same to and fro in horizontal planes; the said means E being carried by the barge B. The clam-shell bucket D and the means E may be and preferably are of the ordinary well known construction, and we have therefore deemed it unnecessary to illustrate and describe the said bucket D and means E in detail. In fact we would have it understood that while we prefer to employ the clam-shell bucket D and the means E for transferring coal to the before-mentioned storage bin, we do not desire to be understood as limiting ourselves to the said bucket and actuating means for the purpose, inasmuch as any transferring means consonant with our invention may be employed without involving departure from the scope of the invention as defined in the claims appended.

F is the main frame of our novel apparatus which is fixed to and rises to a considerable height from the barge B. The said main frame F may be of the general construction illustrated or of any other suitable general construction; and it is provided as best shown in Fig. 1 with a guideway G which extends between opposite sides thereof and is designed for the vertically adjustable frame presently described, and is also provided as best shown in Fig. 2 with a guideway G′ for the elevating receptacle presently described in detail.

At the lower end of the latter guideway G′ is arranged a scale H which may be of any suitable construction and is designed to weigh the coal deposited in the elevating receptacle I precedent to the raising of the said receptacle. The elevating receptacle I when in its lowermost position and on the scale H is positioned to receive coal from the discharge opening J of the fixed storage bin K; the said discharge opening J being controlled by a suitable door L so that when the said door is opened coal may pass from the bin to the receptacle I after the manner shown in Fig. 1. We would also have it understood that in some cases the door L may be dispensed with, in which event coal discharged into the bin K will pass directly therethrough and into the elevating receptacle I.

The elevating receptacle I is connected through a cable M which passes over sheaves as shown in Fig. 1, with a hoisting engine N which *per se* forms no part of our invention and may therefore be of the ordinary well known construction or of any other elected construction. The elevating receptacle I is provided with an inclined bottom a, shown by dotted lines in Fig. 1; and it is also provided with a discharge opening b and a door c which normally closes the opening b to prevent coal from passing out of the receptacle. When, however, the receptacle I is raised to a predetermined height in the main frame F, the door c or an extension thereof brings up against a suitably positioned abutment d on the main frame and is moved by said abutment to an open position so as to permit coal to pass from the receptacle through the opening b. The abutment d is detachably connected to the main frame F and consequently it follows that said abutment may be positioned at various heights on the main frame F so as to effect the discharge of coal from the receptacle I at various heights.

P is the vertically adjustable frame of the apparatus which is arranged in the before-mentioned guideway G of the main frame F and is designed to be raised and lowered and adjustably fixed at various heights by the engine N through the medium of cables R and S past around sheaves as shown in Fig. 1. The said vertically adjustable frame P may be of the general structure illustrated or of any other suitable general structure without involving departure from the scope of our invention as claimed.

T is a hopper fixed to and carried by the vertically adjustable frame P and arranged in the position shown by full lines in Fig. 2 to receive coal from the discharge opening b of the elevating receptacle I and having a discharge opening e, best shown in Fig. 7, disposed at a right angle to the said discharge opening b of receptacle I. When the receptacle I is in the uppermost position shown in Figs. 1 and 2 and the door c thereof is open, the coal will obviously be chuted from the said receptacle I to the hopper T.

U U are slotted guideways which describe an arc of a circle and are spaced apart as best shown in Fig. 3 and are fixedly connected at their ends to the vertically adjustable frame P so as to be carried thereby.

V V are vertically swinging chute supports and guides which are pivoted at W to the vertically adjustable frame P at a point remote from the curvilinear guideways U and are of the form in cross-section shown in Figs. 4 and 6 so as to afford ways f, and are provided on their outer sides with shoes g of angular form in cross-section the outwardly directed portions of which are slidable in the curvilinear guideways U, and X is a chute which is open at its upper side throughout its length. The said chute X is preferably made up of sections h hinged together at i, and it is provided at diametrically opposite points with longitudinal ribs j which are disposed and movable endwise in the ways f of the chute supports and guides V, this in order to permit of the chute being moved endwise in order to discharge the coal at various distances from the vertical plane of the hopper T. From this it follows that by adjusting the vertically adjustable frame P and the chute X, the coal may be discharged into a bunker hole of a vessel at a point comparatively remote from the main frame F, as shown by full lines in Fig. 2, or may be discharged to the vessel at a point or points adjacent to the frame F as shown by dotted lines in said figure.

We prefer to raise the swinging ends of the chute supports and guides V through the medium of the mechanism illustrated in Fig. 3, but we do not desire to be understood as confining ourselves to the said mechanism inasmuch as any other mechanism suitable to the purpose may be employed without affecting our invention. The mechanism illustrated comprises a drum m, a ratchet mechanism n' for holding said drum against casual rotation, and a cable p' arranged on the drum and connected to one of the chute supports and guides V. The chute supports and guides V are connected together as shown in a manner that does not interfere with the endwise adjustment of the chute X therethrough; and by virtue of the mechanism described it will be seen that the supports and guides V may be moved to and adjustably fixed in different positions to pitch the chute X at various angles of inclination to adapt the said chute to discharge at the points desired.

At Y on the lower portion of the vertically adjustable frame P is located an engine, and on the drive-shaft n of the said engine is loosely mounted a clutch pulley p designed to be moved by a hand lever r into and out of engagement with a complementary clutch fixed on the said drive-shaft. The said pulley p is connected through a belt s with a pulley t, and with respect to the pulley t is fixed a drum u around which is looped a cable v which is passed over sheaves w and is connected as indicated by x to widely separated portions of the chute X. By virtue of this construction it will be apparent that when the lever r is manipulated to put the clutch pulley p in engagement with the complementary clutch fixed on the drive-shaft n of the engine Y, the chute X will be moved endwise through the supports and guides V in one direction or the other according to the direction in which the engine shaft is caused to move, to extend the chute to a greater or less extent beyond the right hand side of main frame F, and that when the clutch pulley p is moved out of engagement with the complementary clutch on the shaft n, the chute X will be retained in the position in which it is placed.

Movable endwise through the back wall of the hopper T is a reciprocatory agitator Z which has for its office to facilitate the discharge of coal through the discharge opening e of the said hopper. This agitator Z is pivoted to a link a' and is connected through said link with one arm of a lever b', Fig. 2, the other arm of which lever is pivotally connected to a rod c' which terminates in an eccentric strap d'. The said strap d' receives an eccentric e' on a shaft f' journaled in suitable bearings in the frame P, and in addition to the eccentric e' the shaft f' is provided with a pulley g'. This latter is connected through a belt h' with a pulley on the shaft n of the engine Y, and consequently it follows that when the engine is in action, the shaft f' is rotated from the engine, and through the connection described the agitator Z is reciprocated by the said shaft f'.

As will be gathered from the foregoing the chute X rests under the hopper T and in the same vertical plane as the hopper discharge e, and hence it is obvious that when coal is discharged from the receptacle I into the hopper T, the coal will pass through the hopper T into the chute X and down the latter to the point of discharge.

In the general operation of the apparatus as thus far described, the clam-shell bucket D is employed to transfer coal from a car to the storage bin K, and the coal passes from said storage bin into the receptacle I when the latter is positioned as shown by full lines in Fig. 1. The receptacle I is then raised to the position shown by dotted lines in Fig. 1 when its contents will be discharged into the hopper T. From the hopper T the coal passes to the chute X, and by the latter it is conveyed to the point of discharge, the adjustable spout M³ assisting in the latter function. The said discharge spout M³ is swiveled on the lower end m³ of the chute X, which lower end m³ is of circular form in cross-section, and consequently it will be observed that by manipulating the said spout the coal may be deflected fore and aft of a vessel at the will of an attendant as well as directed downward.

It will be noted that by reason of the vertical adjustability of both the frame P and the chute X steam ships and other vessels of various heights above the water may be coaled with facility, and that the adaptability of the chute X to be extended to a greater or less extent beyond frame F is advantageous because it contributes to the facility with which coal may be properly placed in vessels of various widths. It will also be noted that the coal is conveyed to the bunker holes or hatches of vessels by gravity, and that the chute X may be placed at various angles of inclination when desired to regulate the flow of the coal.

In Fig. 2 of the drawings our novel apparatus is shown in proper relation to an elevated cable T' and a conveying receptacle U' movable on the said elevated cable. In the position illustrated the receptacle U' is arranged to receive from the discharge of the hopper T coal that is supplied to the hopper from the elevating receptacle I, and when filled the said conveying receptacle U' is moved by any suitable means along the cable T' to the point of discharge. This latter arrangement is obviously calculated to be used to advantage in handling coal on plantations and the like; the coal being transferred from cars to the elevating receptacle I in the manner before described in detail, and raised by the said receptacle and discharged by the latter into the hopper T from which it passes into the receptacle U' to be conveyed by the latter to the point at which it is stored.

It will be appreciated from the foregoing that notwithstanding the fact that our novel apparatus is possessed of large capacity and is adapted to be properly operated with but a minimum amount of attention, the apparatus is simple and inexpensive in construction and is also economical in operation.

By reference to Fig. 2 it will be seen that when the vertically adjustable frame P is in its lowermost position and the apparatus is idle, the upper section of the chute X may be positioned close against one side of the main frame F, this in order to lessen the liability of the chute fouling vessels or the rigging of vessels while the apparatus is being moved about a harbor.

Having described our invention, what we claim and desire to secure by Letters-Patent, is:

1. In a loading and unloading apparatus, the combination of a main frame having vertical guideways, a frame adjustable vertically in one of said guideways, means for adjusting and adjustably fixing the vertically adjustable frame, a hopper carried by the vertically adjustable frame, means for receiving material from the said hopper and conveying the same to a point of discharge, an elevating receptacle movable in the other guideway of the main frame and arranged when it reaches the proper position, relative to the hopper, to discharge its contents into said hopper, means for raising the elevating receptacle, and means for supplying material to said receptacle when the same is in a lower position.

2. In a loading and unloading apparatus, the combination of a main frame having vertical guideways, a frame adjustable vertically in one of said guideways, means for adjusting and adjustably fixing the vertically adjustable frame, a hopper carried by the vertically adjustable frame, means for receiving material from the said hopper and conveying the same to a point of discharge, a bin fixed with respect to the main frame and having a discharge, means for transferring material from a source of supply to the said bin, an elevating receptacle movable in the other guideway of the main frame and arranged in its lower position to receive from the bin and also arranged when it reaches the proper position, relative to the hopper on the vertically adjustable frame, to discharge its contents into said hopper, and means for raising the elevating receptacle.

3. In a loading and unloading apparatus, the combination of a frame, and a chute mounted in the frame and pivoted, whereby it is arranged to be swung vertically, and also arranged to be adjusted in the direction of its length with respect to the frame.

4. In a loading and unloading apparatus, the combination of a frame, a chute mounted in the frame and pivoted, whereby it is arranged to be swung vertically, and also arranged to be adjusted in the direction of its length, means for swinging the chute vertically and adjustably fixing the same at various angles of inclination, and means for adjusting the chute in the direction of its length and adjustably fixing it against endwise movement.

5. In a loading and unloading apparatus, the combination of a frame, a vertically swinging support and guide pivoted to the frame, means for adjustably fixing said support and guide at various angles of inclination, a chute carried by and arranged to swing with said guide and support and also arranged to be adjusted endwise on the guide and support, and means for adjustably fixing the chute with respect to the guide and support.

6. In a loading and unloading apparatus, the combination of a frame, a vertically swinging support and guide pivoted to the frame, means for swinging said support and guide vertically and adjustably fixing the same at various angles of inclination, a chute carried by and arranged to swing with said guide and support and also arranged to be adjusted endwise on the guide and support, and means for adjusting the chute endwise and adjustably fixing the same with respect to the guide and support.

7. In a loading and unloading apparatus, the combination of a frame, a vertically swinging support and guide pivoted to the frame, means for adjustably fixing said support and guide at various angles of inclination, a chute carried by and arranged to swing with said guide and support and also arranged to be adjusted endwise on the guide and support, a motor, a drum, a cable arranged to be moved by the drum and connected to opposite portions of the chute, and means for making and interrupting connection between the motor and the drum.

8. The combination in a loading and unloading apparatus, of a frame, an endwise adjustable chute mounted in the frame, a motor, a drum, a cable connected with opposite portions of the chute and arranged to be moved by the drum, and means for making and interrupting connection between the motor and the drum.

9. The combination in a loading and unloading apparatus, of a main frame having a vertical guideway, a vertically adjustable frame disposed in said guideway, means for adjusting and adjustably fixing said vertically adjustable frame, a hopper carried by the vertically adjustable frame, means for elevating the material and discharging the same into the hopper, means for receiving material from the hopper and conveying the same to a point of discharge, a motor mounted on the vertically adjustable frame, a shaft bearing an eccentric and connected with the motor; said shaft being journaled in the vertically adjustable frame, a lever fulcrumed on the vertically adjustable frame, a rod connected with one arm of said lever and having a strap receiving the eccentric, and a reciprocatory agitator connected with the other arm of the lever and working through a wall of the hopper.

10. The combination in a loading and unloading apparatus, of a frame, a guide and support carried by said frame, a chute carried by and adjustable lengthwise on the guide and support and comprising sections hinged together at their meeting ends, and means for adjustably fixing the chute with respect to the guide and support and the frame.

11. In a loading and unloading apparatus, the combination of a frame, arcuate guideways connected to the frame, vertically swinging guides and supports pivoted to the frame and having shoes disposed in the arcuate guideways and also having guideways at their inner sides, means for adjustably fixing the said guides and supports, a chute having ribs at opposite sides disposed and movable endwise in the guideways of the guides and supports, whereby the chute is adjustable endwise on the guides and supports, and means for adjustably fixing the chute against endwise movement.

In testimony whereof we have hereunto set our hands in presence of two subscribing witnesses.

GEORGE W. THEISS.
    ROBERT J. W. WHANN.
    WILLIAM J. ENGLISBEE.

Witnesses as to George W. Theiss:
 J. FRANK TILLEY,
 J. M. RUMBERGER.

Witnesses as to Robert J. W. Whann and William J. Englisbee:
 J. N. EMMONS,
 LOUIS P. BRYANT.